United States Patent [19]

Ibaraki et al.

[11] Patent Number: 4,747,132
[45] Date of Patent: May 24, 1988

[54] HOWLING CANCELLER

[75] Inventors: Satoru Ibaraki, Higashiosaka; Hiroki Furukawa, Neyagawa; Hiroyuki Naono, Hirakata, all of Japan

[73] Assignee: Matsushita Electric Industrial Co., Ltd., Osaka, Japan

[21] Appl. No.: 719,740

[22] Filed: Apr. 3, 1985

[30] Foreign Application Priority Data

| Apr. 9, 1984 | [JP] | Japan | 59-70305 |
| Jun. 11, 1984 | [JP] | Japan | 59-119347 |
| Jun. 15, 1984 | [JP] | Japan | 59-123064 |
| Sep. 4, 1984 | [JP] | Japan | 59-185536 |

[51] Int. Cl.⁴ ............................................. H04B 3/23
[52] U.S. Cl. .................................... 379/390; 379/410
[58] Field of Search ............... 179/170.2, 81 B, 170.6, 179/170.8, 121 D; 381/92, 155; 379/406, 388, 407, 389, 410, 390, 411; 370/32, 32.1

[56] References Cited

U.S. PATENT DOCUMENTS

| 3,500,000 | 3/1970 | Kelly, Jr. et al. | 379/410 |
| 3,895,188 | 3/1974 | Ingraham | 381/155 |
| 4,268,727 | 5/1981 | Agrawal et al. | 379/411 |
| 4,311,874 | 1/1982 | Wallace, Jr. | 381/92 X |
| 4,405,840 | 9/1983 | Zebo | 379/411 |
| 4,421,957 | 12/1983 | Wallace, Jr. | 381/155 |
| 4,549,048 | 10/1985 | Combier | 370/32.1 |
| 4,591,670 | 5/1986 | Itoh | 370/32.1 |
| 4,609,787 | 9/1986 | Horna | 379/410 X |

FOREIGN PATENT DOCUMENTS 0003430  1/1983  Japan .

OTHER PUBLICATIONS

"Electronic Detection of Acoustic Feedback and Automatic Sound System Gain Control", E. T. Patronis, Jr., Journal of the Audio Engineering Society, Alanta, Ga., vol. 26, No. 5, May 1978, pp. 323-326.
"Proceedings of the International Teleconference Symposium", Apr. 3-5, 1984, Communications Satellite Corporation (Comsat) USA Marriott Hotel, Philadelphia, Overseas Telecommunication Commission Australia (OTC) The Conference Center, OTC House, Sydney.
"Cancellation of Acoustic Feedback in Teleconference Rooms", Horna, O.A., Comsat Labs., Clarksburg, Md., U.S.A., IEEE Sourtheastcon '83 Conference Proceedings pp. 284-289 1983, Apr. 11-14, 1983 Orlando, Fla., U.S.A.
"An adaptive Echo Canceller Using Digital Signal Processor LSI Chips", Ozawa, K. et al., Canoc Systems Res. Labs., Nec Corp., Kawasaki, Japan, IEEE Proceedings of ICASSP 83. IEEE International Converence on Acoustics, Speech and Signal Processing pp. 466-469 vol. 1, Apr. 14-16, 1983.
"A Microprocessor Echo Canceller", Araseki, T.; Itoh, Y.; Ochiai, K. Nippon Electric Co., Ltd. Kawasaki, Japan, IEEE; Telglobe Canada et al. Fourth International Conference on Digital Satellite Communications pp. 219-224, 1978, Oct. 23-25, 1978, Montreal, Canada.
"Cancellation of Acoustic Feedback", Horna, O., pp. 319-333, Index: Echo Control, Telephone Transmission, Integrated Circuits, Filters.

Primary Examiner—Jin F. Ng
Assistant Examiner—R. Vass
Attorney, Agent, or Firm—Wenderoth, Lind & Ponack

[57] ABSTRACT

A howling canceller includes a group of filters for dividing an output of a microphone into a plurality of frequency bands, a transfer characteristic estimation unit for estimating a transfer characteristic (i.e.-impulse response) of a low frequency range in an echo path extending from a loudspeaker to the microphone, an echo signal estimation unit for producing an approximate echo signal of the low frequency range proceeding from the loudspeaker to the microphone, a subtracter for subtracting an output of the echo signal estimation unit from an output of a low-pass filter of the filters, and an adder for adding an output of the subtracter to outputs of the filters other than the low-pass filter.

10 Claims, 12 Drawing Sheets

HOWLING CANCELLER

BACKGROUND OF THE INVENTION

The present invention generally relates to a sound reinforcement system and more particularly, to a howling canceller for cancelling howling of the sound reinforcement system by using a digital filter.

Due to recent development of conference systems based on telecommunication, there is a keen demand for a howling canceller which enables a sound reinforcement system to louden sounds clearly and naturally.

Hereinbelow, a known howling canceller provided with a digital filter will be described with reference to FIG. 1. The known howling canceller includes a microphone 1, a microphone amplifier 2, a subtracter 3, a transfer characteristic estimation unit 4 for storing therein a transfer characteristic between the microphone 1 and a loudspeaker 8 as an impulse response therebetween, and a switch 5 for controlling operations of the estimation unit 4. When the switch 5 is closed, the transfer characteristic is estimated by the estimation unit 4. On the contrary, when the switch 5 is opened, estimation of the transfer characteristic by the estimation unit 4 is stopped.

The known howling canceller further includes a digital filter (hereinbelow referred to as an "echo signal estimation unit") 6, a loudspeaker amplifier 7, a switch 9 and a source 10 of white noises. The echo signal estimation unit 6 performs convolution of the impulse response stored in the transfer characteristic estimation unit 4 and an input signal applied to the loudspeaker amplifier 7. Meanwhile, the switch 9 is arranged to disconnect the microphone 1 from the loudspeaker system including the loudspeaker amplifier 7 and the loudspeaker 8 and input the white noises to the loudspeaker system when the transfer characteristic is estimated by the estimation unit 4.

Hereinbelow, operations of the known howling canceller of the above described arrangement will be described. Initially, the switch 5 is closed and the switch 9 is connected to a contact B such that the transfer characteristic, i.e., the impulse response between the loudspeaker 8 and the microphone 1 is estimated by the estimation unit 4. The white noises outputted from the source 10 are loudened by the loudspeaker amplifier 7 and the loudspeaker 8 and then, are received by the microphone 1. The white noises outputted from the source 10 are also inputted to the echo signal estimation unit 6. In the echo signal estimation unit 6, convolution of the signal of the white noises and the estimated impulse response delivered from the estimation unit 4 is calculated so as to obtain an estimated echo signal. Then, in the subtracter 3, the estimated echo signal of the estimation unit 6 is subtracted from an output of the microphone amplifier 2. Thereafter, the output of the subtracter 3 is transmitted to the transfer characteristic estimation unit 4 which corrects the estimated impulse response stored therein so as to reduce the output of the subtracter 3. Subsequently, by using the corrected estimated impulse response, calculation and subtraction of the estimated echo signal are again performed in the estimation unit 6 and the subtracter 3, respectively, so that a new output is delivered from the subtracter 3 and thus, the estimated impulse response is again corrected by the estimation unit 4 so as to reduce the new output of the subtracter 3. When the above described operational procedure has been repeated a sufficient number of times, the output of the subtracter 3 finally becomes zero. As a result, an impulse response subjected to excellent approximation is stored in the estimation unit 4. Thus, after the transfer characteristic has been estimated by the estimation unit 4, the switch 5 is opened so as to prevent the estimation unit 4 from correcting the estimated impulse response. Then, the switch 9 is connected to a contact A such that sounds inputted to the microphone 1 are loudened by the loudspeaker amplifier 7 and the loudspeaker 8. At the time of loudening of the sounds inputted to the microphone 1, since an echo signal delivered from the loudspeaker 8 to the microphone 1 is estimated from the output of the microphone 1, the howling loop is interrupted and thus, generation of howling is cancelled.

Arithmetic operations of the transfer characteristic estimation unit 4 and the echo signal estimation unit 6 are performed digitally. Supposing that an input signal applied not only to the estimation unit 6 but to the loudspeaker amplifier 7 and an estimated impulse response inputted from the estimation unit 4 to the estimation unit 6 are, respectively, represented by x(n) and h(n), an estimated echo signal y is expressed by the following equation (1) for calculating the convolution:

$$y = \sum_{n=0}^{N} x(-n) \cdot h(n) \tag{1}$$

where:
N = total number (hereinbelow referred to as a "tap number") of digitized sampling data of analog signals x and h, and
n = serial number of the tap number N.

Assuming that a character $\Delta t$ denotes a sampling period for digitizing the analog signals x and h, a time period T of the estimated impulse response h and a high frequency limit F are given by the following equation (2):

$$T = N \cdot \Delta t \tag{2}$$

$$F = \frac{1}{2 \cdot \Delta t}$$

Accordingly, in the case where the sampling period $\Delta t$ is constant, it becomes possible to eliminate longer echoes as the tap number N is increased. On the other hand, as the sampling period $\Delta t$ is reduced, it becomes possible to eliminate echoes of higher frequency.

However, in the above described arrangement of the prior art howling canceller, since echoes of signals up to a high frequency range are required to be eliminated, the sampling period $\Delta t$ is reduced. Thus, in the case where it is impossible to increase the tap number N to a large value, an echoing time period to be eliminated is reduced and thus, howling cannot be cancelled sufficiently.

Furthermore, since increase of the tap number N leads to increase of a time period required for calculating the equation (1), such problems arise that it becomes impossible to perform the real-time processing and production cost of the prior art howling canceller rises extremely.

Moreover, in the above described arrangement of the known howling canceller, if the white noises emitted from the loudspeaker 8 at the time of estimation of the transfer characteristic, i.e., a level of an estimated sound of the transfer characteristic is not raised considerably, a satisfactory S/N ratio cannot be obtained in a room of poor sound proof, thereby resulting in unsatisfactory cancellation of the howling. In addition, in the room of poor sound proof, such problems are encountered that noises outside the room penetrate into the room and sounds inside the room leak out of the room.

SUMMARY OF THE INVENTION

Accordingly, an essential object of the present invention is to provide an improved howling canceller which is low in production cost and cancels howling remarkably by restricting to a low frequency range, a frequency band subjected to echo elimination of an echo signal estimation unit, with substantial elimination of disadvantages inherent in conventional howling cancellers of this kind.

Another important object of the present invention is to provide an improved howling canceller of the above described type which is capable of cancelling howling sufficiently by the use of even a sound of small sound volume for estimating a transfer characteristic.

In order to accomplish these objects of the present invention, a howling canceller according to one preferred embodiment of the present invention comprises a group of filters for dividing an output of a microphone into a plurality of frequency bands, which includes a first filter having a pass band lower than that of any other one of said filters;

a transfer characteristic estimation unit for estimating a transfer characteristic (i.e.-impulse response) of a low frequency range in an echo path extendiing from a loudspeaker to said microphone, which transfer characteristic of the low frequency range is outputted from said first filter;

an echo signal estimation unit for producing, by using an estimated transfer characteristic (i.e.-impulse response) outputted from said transfer characteristic estimation unit and an input signal applied to said loudspeaker, an approximate echo signal of the low frequency range proceeding from said loudspeaker to said microphone;

a subtracter for subtracting an output of said echo signal estimation unit from an output of said first filter; and an adder for adding an output of said subtracter to outputs of said filters other than said first filter.

Thus, in the howling canceller according to one preferred embodiment of the present invention, howling in the low frequency range is cancelled through elimination of the echo signal, while howling in the high frequency range is cancelled through elimination of the echo signal by the use of a highly directive microphone or adjustments of respective pass bands and gains of the group of the filters.

Accordingly, in accordance with the present invention, the howling canceller capable of cancelling howling effectively can be produced at low cost.

Furthermore, a howling canceller according to another embodiment of the present invention comprises a frequency analyzer for performing frequency analysis of an output signal of a microphone on the basis of noises of a room including said microphone;

a filter whose frequency characteristic is so controlled in accordance with an output of said frequency analyzer as to assume a higher gain in a frequency band where said noises have a higher level;

a source of white noises, which delivers through said filter to a loudspeaker, a signal for estimating a transfer characteristic in an echo path extending from said loudspeaker to said microphone;

a transfer characteristic estimation unit for estimating said transfer characteristic by inputting said signal to said loudspeaker;

an echo signal estimation unit for producing, by using an estimated transfer characteristic outputted from said transfer characteristic estimation unit and an input signal applied to said loudspeaker, an approximate echo signal proceediing from said loudspeaker to said microphone; and a subtractor for subtracting an output of said echo signal estimation unit from said output signal of said microphone.

Thus, in the howling canceller according to another embodiment of the present invention, colored noises adjusted to a minimum sound pressure level necessary for sufficiently cancelling howling in the overall frequency range are generated by the frequency analyzer, the filter and the source of white noises so as to be employed as a sound for estimating the transfer characteristic.

Accordingly, in accordance with the present invention, the howling canceller capable of estimating the transfer characteristic by the use of sounds of small sound volume can be obtained.

BRIEF DESCRIPTION OF THE DRAWINGS

These and other objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 2:
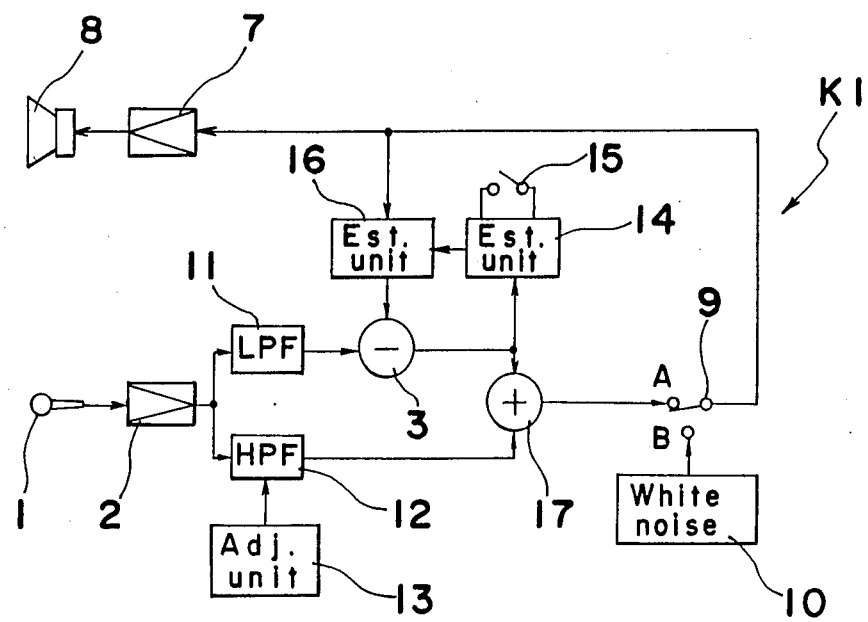
FIG. 2 is a block diagram of a howling canceller according to a first embodiment of the present invention.

Referring now to the drawings, there is shown in FIG. 2, a howling canceller K1 according to a first embodiment of the present invention. The howling canceller K1 includes a microphone 1, a microphone amplifier 2, a loudspeaker amplifier 7, a loudspeaker 8, a low-pass filter (LPF) 11, a high-pass filter (HPF) 12, an adjustment unit 13 for adjusting a cut-off frequency, a subtracter 3, a transfer characteristic estimation unit 14, a switch 15 for controlling operations of the transfer characteristic estimation unit 14 and a digital filter (hereinbelow, referred to as an "echo signal estimation unit") 16. When the switch 15 is closed, the transfer characteristic is estimated by the estimation unit 14. On the contrary, when the switch 15 is opened, estimation of the transfer characteristic by the estimation unit 14 is stopped. The transfer characteristic estimation unit 14 stores therein a transfer characteristic between the microphone 1 and the loudspeaker 8 as an impulse response therebetween. The echo signal estimation unit 16 performs convolution of the impulse response stored in the transfer characteristic estimation unit 14 and an input signal applied to the loudspeaker amplifier 7.

The howling canceller K1 further includes an adder 17, a switch 9 and a source 10 of white noises. When the transfer characteristic is estimated by the estimation unit 14, the switch 9 is arranged to disconnect the microphone 1 from a loudspeaker system including the loudspeaker amplifier 7 and the loudspeaker 8 and input the white noises to the loudspeaker system.

Hereinbelow, operations of the howling canceller K1 of the above described arrangement will be described. Initially, the switch 15 is closed and the switch 9 is connected to a contact B such that the transfer characteristic between the loudspeaker 8 and the microphone 1 is estimated by the estimation unit 14. The white noises outputted from the source 10 are loudened by the loudspeaker amplifier 7 and the loudspeaker 8 and then, are received by the microphone 1. The white noises outputted from the source 10 are also inputted to the echo signal estimation unit 16. In the echo signal estimation unit 16, convolution of the signal of the white noises and the estimated impulse response delivered from the estimation unit 14 is calculated so as to obtain an estimated echo signal. Then, in the subtracter 3, the estimated echo signal of the estimation unit 16 is subtracted from an output of the LPF 11. Thereafter, the output of the subtracter 3 is delivered to the estimation unit 14 which corrects the estimated impulse response stored therein so as to reduce the output of the subtracter 3. Subsequently, by using the corrected estimated impulse response, calculation and subtraction of the estimated echo signal are again performed in the estimation unit 16 and the subtracter 3, respectively, so that a new output is delivered from the subtracter 3 and thus, the estimated impulse response is again corrected by the estimation unit 14 so as to reduce the new output of the subtracter 3. When the above described operational procedure has been repeated a sufficient number of times, the output of the subtracter 3 finally becomes zero. As a result, an impulse response subjected to excellent approximation is stored in the estimation unit 14. Thus, after the transfer characteristic has been estimated by the estimation unit 14, the switch 15 is opened so as to prevent the estimation unit 14 from correcting the estimated impulse response.

Subsequently, the switch 9 is connected to a contact A such that sounds inputted to the microphone 1 are loudened by the loudspeaker amplifier 7 and the loudspeaker 8. At the time of loudening of the sounds inputted to the microphone 1, the output of the microphone amplifier 2 is divided into the low frequency component and the high frequency component by the LPF 11 and the HPF 12, respectively. In the case of a signal composed only of the low frequency component, an echo signal contained in the low frequency component is eliminated therefrom by the subtracter 3 and the estimation units 14 and 16. The low frequency component whose echo signal has been eliminated therefrom is added, at the adder 17, to the high frequency component separated at the HPF 12 so as to be loudened by the loudspeaker amplifier 7 and the loudspeaker 8. Since the echo signal of the low frequency range is eliminated, howling does not take place in the low frequency range. Meanwhile, since howling does not readily take place also in the high frequency range due to a reason to be described later, howling takes place only in the intermediate frequency range. Accordingly, when the cut-off frequency of the HPF 12 is raised by the adjustment unit 13 so as to be set higher than a frequency band where howling takes place, it becomes possible to eliminate howling effectively.

Figure 3:
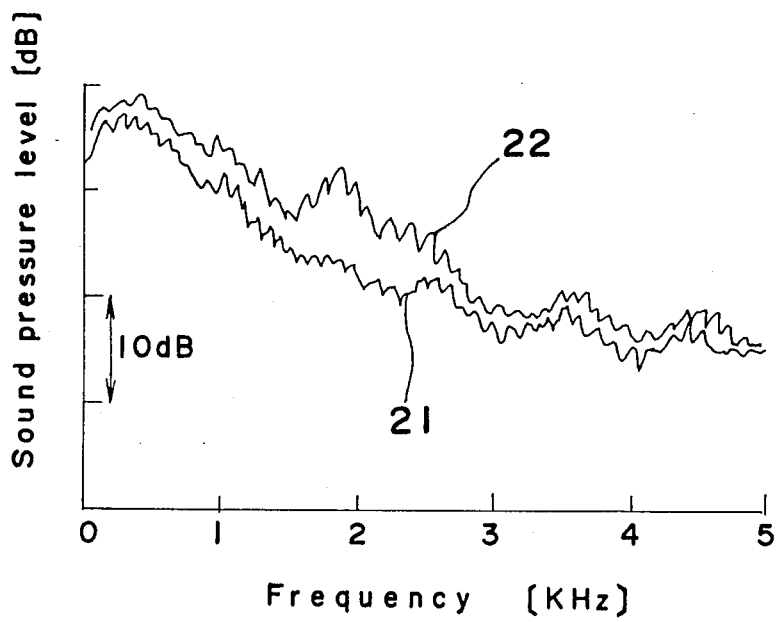
FIG. 3 is a graph indicative of frequency characteristics between a loudspeaker and a microphone in the howling canceller of FIG. 2.

Then, a principle of the present invention will be described by using measured values of the transfer characteristics between the loudspeaker 8 and the microphone 1 with reference to FIG. 3, hereinbelow. In FIG. 3, the transfer characteristics between the loudspeaker 8 and the microphone 1 were measured with respect to the frequency by placing in two kinds of auditoriums, the loudspeaker 8 and the microphone 1 spaced 1 m from each other. As will be readily seen from FIG. 3, values of transfer characteristics 21 and 22 are reduced in both of the sound fields through sound absorption of wall, etc. as the frequency is raised higher. Thus, howling mainly takes place in the low frequency range up to 1.5 KHz. Furthermore, at frequencies ranging from 1.5 to 3 KHz, the transfer characteristics 21 and 22 are likely to be affected to a considerable degree by the sound fields. Meanwhile, as described earlier with respect to equation (2) of the prior art howling canceller, arithmetic operations of the estimation units 14 and 16 are performed digitally and, howling can be cancelled by the estimation unit 16 at lower cost as the sampling period $\Delta t$ is increased and the high frequency limit F is lowered.

Figure 4:
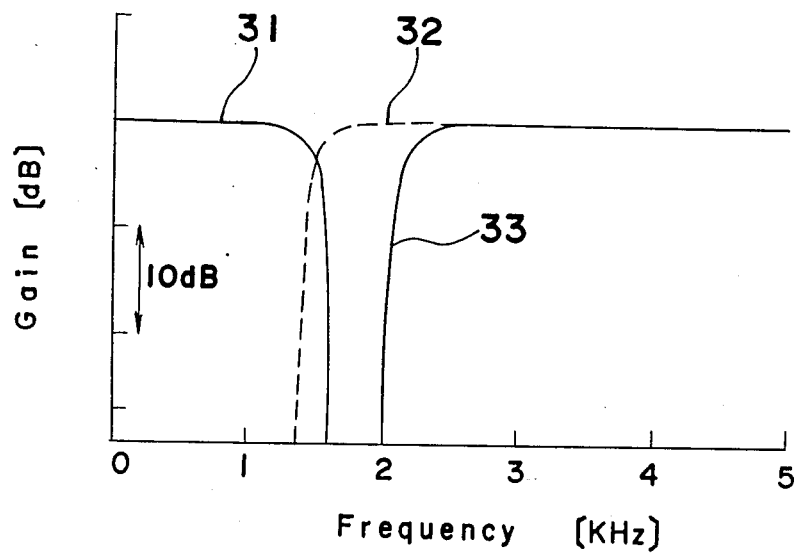
FIG. 4 is a graph indicative of frequency characteristics of portions of the howling canceller of FIG. 2.

Thus, in the howling canceller K1, as shown in FIG. 4, howling is cancelled in a frequency band not exceeding 1.5 KHz by the estimation unit 16 as indicated by a transfer characteristic 31. Furthermore, howling occurring at frequencies ranging from 1.5 to 3 KHz in a specific sound field is cancelled by raising the cut-off frequency of the HPF 12 from a frequency characteristic 32 to a frequency characteristic 33. In the case where speech is inputted to the microphone 1, unnatural auditory sensation is not produced even if the narrow intermediate frequency component is eliminated.

Thus, in accordance with the first embodiment of the present invention, the howling canceller capable of cancelling howling effectively can be produced at low cost.

Figure 5:
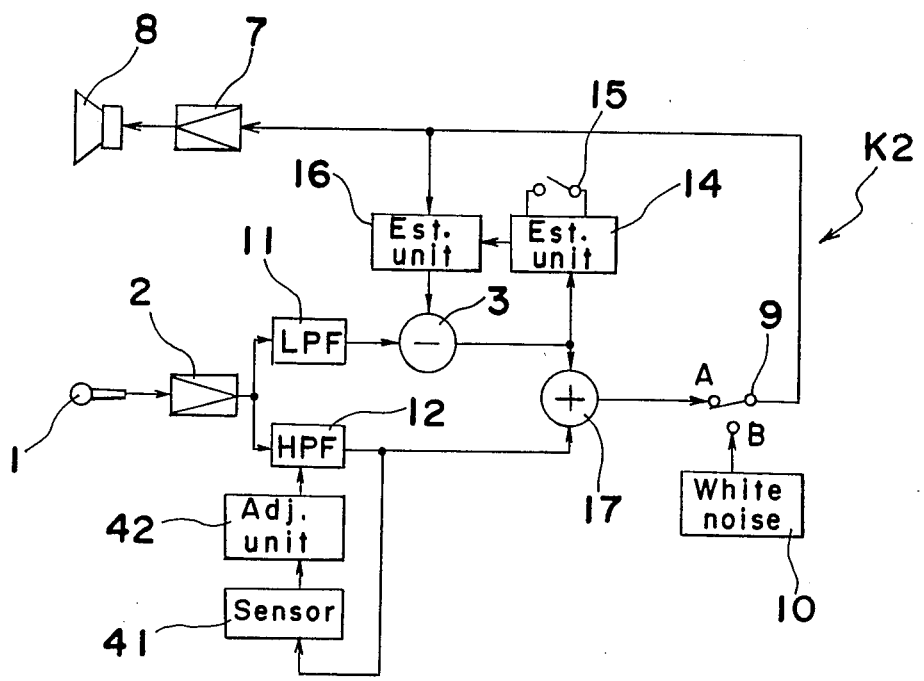
FIGS. 5, 6 and 7 are diagrams similar to FIG. 2, particularly showing howling cancellers according to second, third and fourth embodiments of the present invention, respectively.

Referring to FIG. 5, there is shown a howling canceller K2 according to a second embodiment of the present invention. The howling canceller K2 includes a sensor 41 for detecting howling in the high frequency range and an adjustment unit 42 for adjusting a cut-off frequency. When howling has been detected by the sensor 41, the adjustment unit raises the cut-off frequency of the HPF 12. Since other constructions of the howling canceller K2 are the same as those of the howling canceller K1, detailed description thereof is abbreviated for the sake of brevity.

In the howling canceller K2 of the above described arrangement, adjustment of the cut-off frequency, which is made in the howling canceller K1, is automatically performed. Various methods of detecting howling can be employed in the howling canceller K2. For example, it is possible to judge, upon detection of a sound pressure exceeding a predetermined level at the time when no input is being applied to the microphone 1, that howling takes place.

Figure 6:
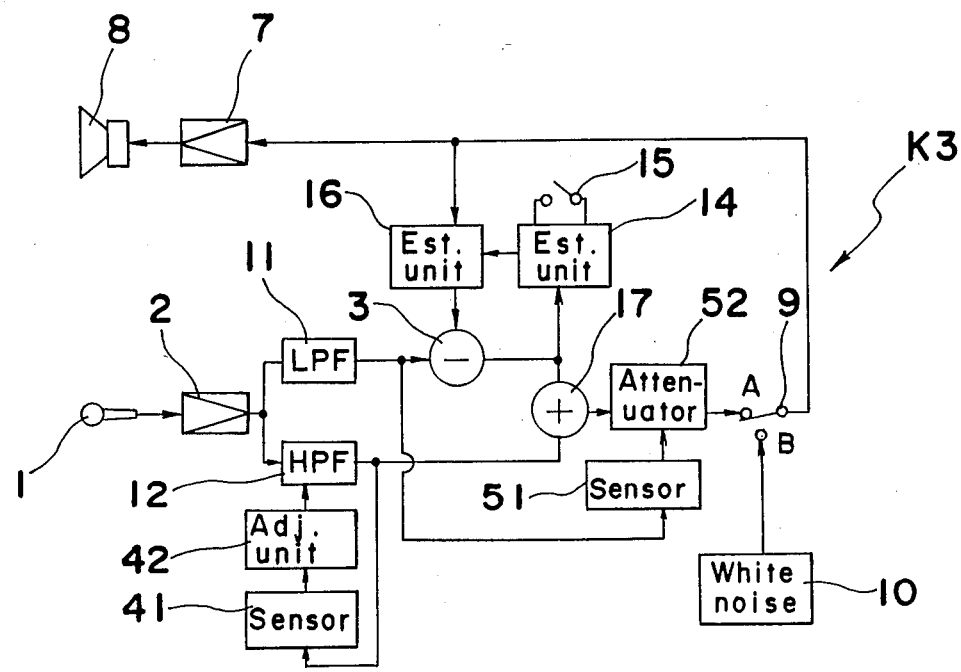

Referring to FIG. 6, there is shown a howling canceller K3 according to a third embodiment of the present invention. The howling canceller K3 includes a sensor 51 for detecting howling in the low frequency range and an attenuator 52 for an overall frequency range, which increases an attenuated amount when howling has been detected by the sensor 51. Since other constructions of the howling canceller K3 are the same as those of the howling canceller K2, detailed description thereof is abbreviated for the sake of brevity.

In the howling canceller K3 of the above described arrangement, automatic adjustment of gain of the loudspeaker system based on the howling in the low frequency range, which cannot be performed in the howling canceller K2, can be performed and thus, the howling canceller K3 can be operated remarkably easily, which is a fairly desirable effect.

Figure 7:
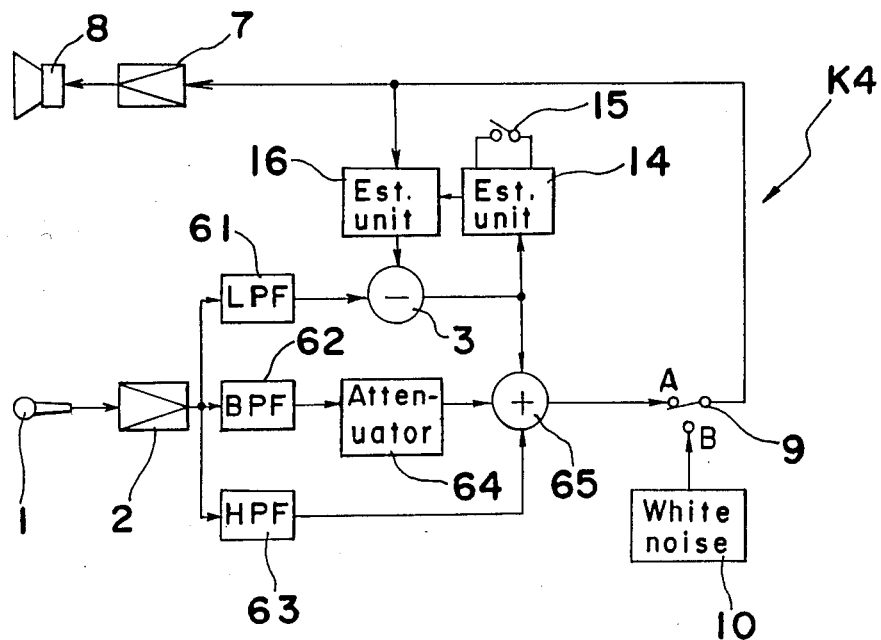

Referring to FIG. 7, there is shown a howling canceller K4 according to a fourth embodiment of the present invention. The howling canceller K4 includes a low-path filter (LPF) 61, a band-pass filter (BPF) 62, a high pass filter (HPF) 63, an attenuator 64 for an intermediate frequency range and an adder 65. Since other constructions of the howling canceller K4 are the same as those of the howling canceller K1, detailed description thereof is abbreviated for the sake of brevity.

In the howling canceller K4 of the above described arrangement, the output from the microphone 1 is amplified by the microphone amplifier 2 and then, is divided into the low frequency component, the intermediate frequency component and the high frequency component by the LPF 61, the BPF 62 and the HPF 63, respectively. The signal filtered by the LPF 61 is composed of only the low frequency component and an echo signal contained in the low frequency component is eliminated therefrom by the subtracter 3, the transfer characteristic estimation unit 14 and the echo signal estimation unit 16 in the same manner as in the howling canceller K1. On the other hand, in the same manner as in the howling canceller K1, the signal, which has been filtered into only the high frequency component by the HPF 63, is added, at the adder 65, to the low frequency component whose echo signal has been eliminated therefrom. Meanwhile, the intermediate frequency component between the cut-off frequency of the LPF 61 and the cut-off frequency of the HPF 63, which is eliminated in the howling canceller K1, is picked up by the BPF 62 and then, is attenuated to a predetermined degree by the attenuator 64 for the intermediate frequency range so as to be added to the low frequency component and the high frequency component at the adder 65.

Figure 8:
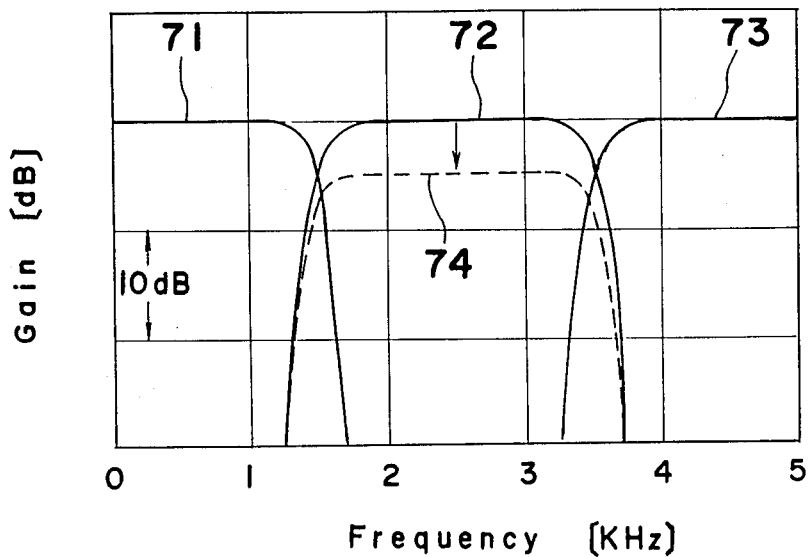
FIG. 8 is a view similar to FIG. 4, particularly showing the fourth embodiment of the present invention.

A howling cancelling principle of the howling canceller K4 will be described with reference to FIGS. 3 and 8, hereinbelow. In FIG. 8, reference numerals 71 and 73 represent input-output frequency characteristics of the LPF 61 and the HPF 63, respectively. Meanwhile, reference numerals 72 and 74 represent input-output frequency characteristics of a combination (hereinbelow referred to as a "band-pass filter portion") of the band-pass filter 62 and the attenuator 64 for the intermediate frequency range. In the case of the sound field having the transfer characteristic 21 of FIG. 3, frequencies liable to produce howling are limited to the low frequency range up to 1.5 KHz. Thus, howling can be substantially cancelled by cancelling howling in the low frequency range through elimination of the echo signal from the low frequency component as described earlier. Consequently, gain of the intermediate frequency range, i.e., gain of the BPF 62 is not required to be attenuated and therefore, is set at the transfer characteristic 72. Furthermore, since howling does not take place in the high frequency range, the transfer characteristic for the high frequency range is set at the transfer characteristic 73. As a result, since an output from the adder 65 has a uniformly flat frequency characteristic, tone quality does not deteriorate.

Then, in the case of the sound field having the transfer characteristic 22 of FIG. 3, it becomes impossible to neglect the transfer characteristic in the intermediate frequency range of 1.5 to 3.5 KHz, i.e., the echo signal. Thus, in the case where the uniformly flat frequency characteristic is used, it becomes impossible to increase gain of the loudspeaker system due to howling in the intermediate frequency range. In this case, generation of howling can be prevented by lowering gain of the band-pass filter portion to the transfer characteristic 74. When an attenuated amount of the gain of the band-pass filter portion, i.e., an attenuated amount of the attenuator 64 for the intermediate frequency range is restricted to 6 dB or less, deterioration of tone quality of loudened speech can be substantially prevented partly because of a narrow width of the intermediate frequency range. As is clear from the foregoing, in the howling canceller K4, since the intermediate frequency range, which is not employed in the howling cancellers K1, K2 and K3, is employed, excellent tone quality can be obtained.

Meanwhile, the cut-off frequencies of the respective filters are set at 1.5 KHz and 3.5 KHz in the howling cancellers K1 to K4. However, in the case where other transfer characteristics different from those shown in FIG. 3 are obtained due to characteristics and setting conditions of the microphone 1 and the loudspeaker 8, cut-off frequencies corresponding to the other transfer characteristics can be employed.

Figure 9:
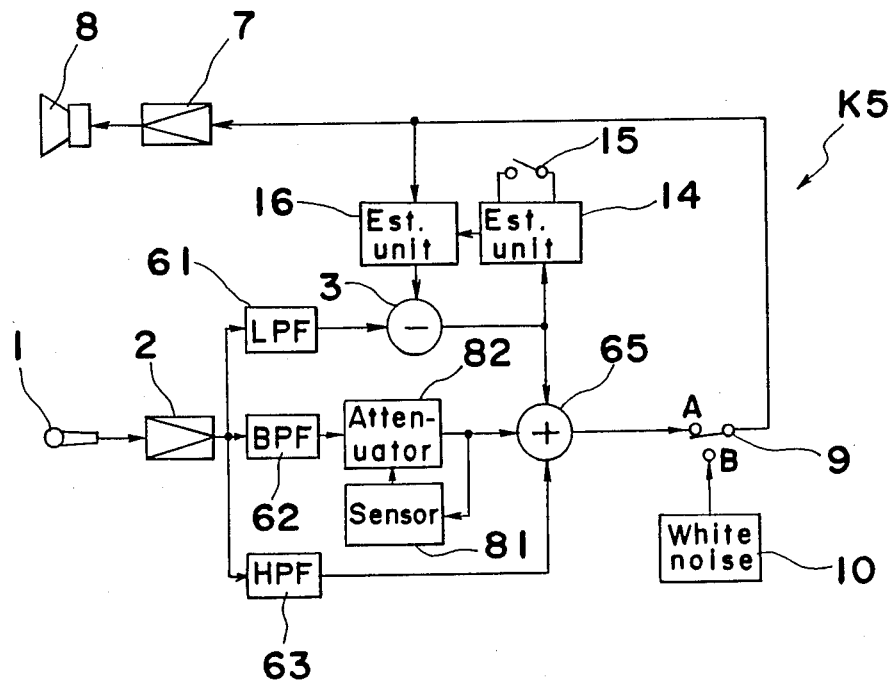
FIGS. 9, 10, 11, 12 and 13 are diagrams similar to FIG. 2, particularly showing howling cancellers according to fifth, sixth, seventh, eighth and ninth embodiments of the present invention, respectively.

Referring further to FIG. 9, there is shown a howling canceller K5 according to a fifth embodiment of the present invention. The howling canceller K5 includes a sensor 81 for detecting howling in the intermediate frequency range and an attenuator 82 of the intermediate frequency range, which increases an attenuated amount when howling has been detected by the sensor 81. Since other constructions of the howling canceller K5 are the same as those of the howling canceller K4, detailed description thereof is abbreviated for the sake of brevity.

In the howling canceller K5 of the above described arrangement, adjustment of the attenuated amount of the attenuator 82, which is made in the howling canceller K4, is performed automatically. Various methods of detecting howling can be employed in the howling canceller K5. For example, it is possible to judge, upon detection of a sound pressure exceeding a predetermined level at the time when no input is being applied to the microphone 1, that howling takes place. Thus, since howling in the intermediate frequency range can be cancelled automatically by the howling canceller K5, the howling canceller K5 can be operated easily.

Figure 10:
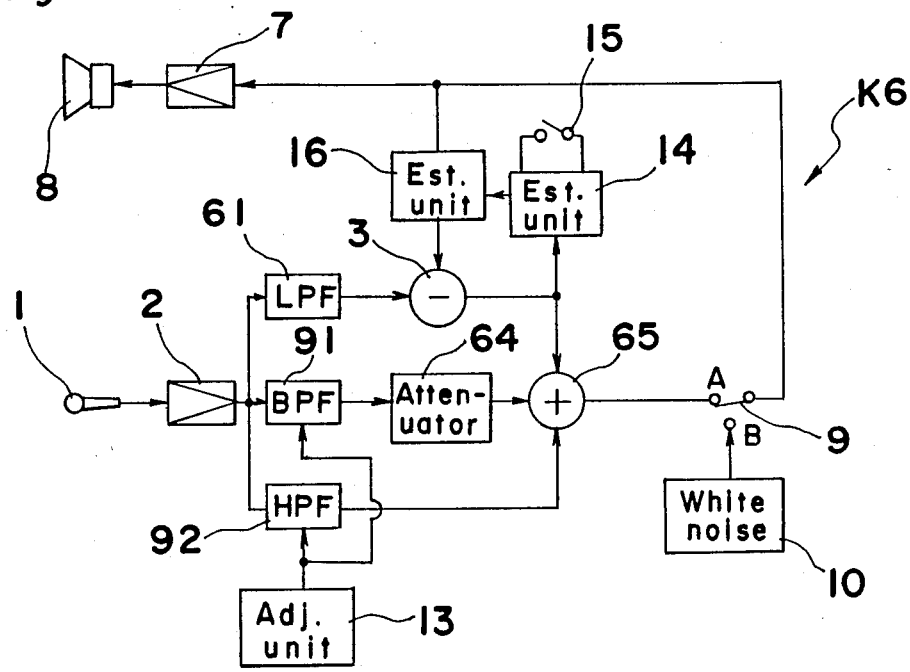

Referring to FIG. 10, there is shown a howling canceller K6 according to a sixth embodiment of the present invention. The howling canceller K6 includes a band-pass filter (BPF) 91, a high-pass filter (HPF) 92 and the adjustment unit 13 for adjusting the cut-off frequency. By using the adjustment unit 13, the higher cut-off frequency of the BPF 91 and the cut-off frequency of the HPF 92 can be changed simultaneously while being set to be identical with each other. Since other constructions of the howling canceller K6 are the same as those of the howling canceller K4, detailed description thereof is abbreviated for the sake of brevity. Thus, since an optimum division of the frequency bands can be easily determined in the howling canceller K6 so as to correspond to characteristics and setting conditions of the microphone 1 and the loudspeaker 8, the howling canceller K6 has a wide range of applications.

Figure 11:
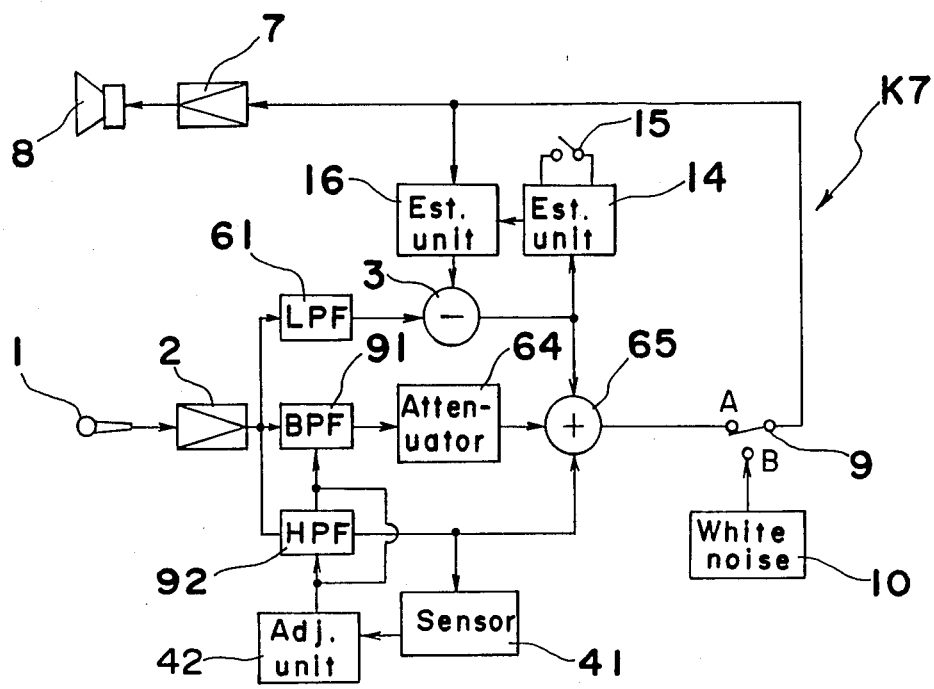

Referring to FIG. 11, there is shown a howling canceller K7 according to a seventh embodiment of the present invention. The howling canceller K7 includes the sensor 41 for detecting howling in the high frequency range and the adjustment unit 42 for adjusting the cut-off frequency as in the howling canceller K2 of FIG. 5. When howling has been detected by the sensor 41, the adjustment unit 42 transmits to the BPF 91 and the HPF 92, a signal for raising the cut-off frequencies of the BPF 91 and the HPF 92. Since other constructions of the howling canceller K7 are the same as those of the howling canceller K6, detailed description thereof is abbreviated for the sake of brevity. Thus, since adjustment of the cut-off frequency, which is made in the howling canceller K6, can be performed automatically in the howling canceller K7, the howling canceller K7 has a wide range of applications and can be operated easily.

Figure 12:
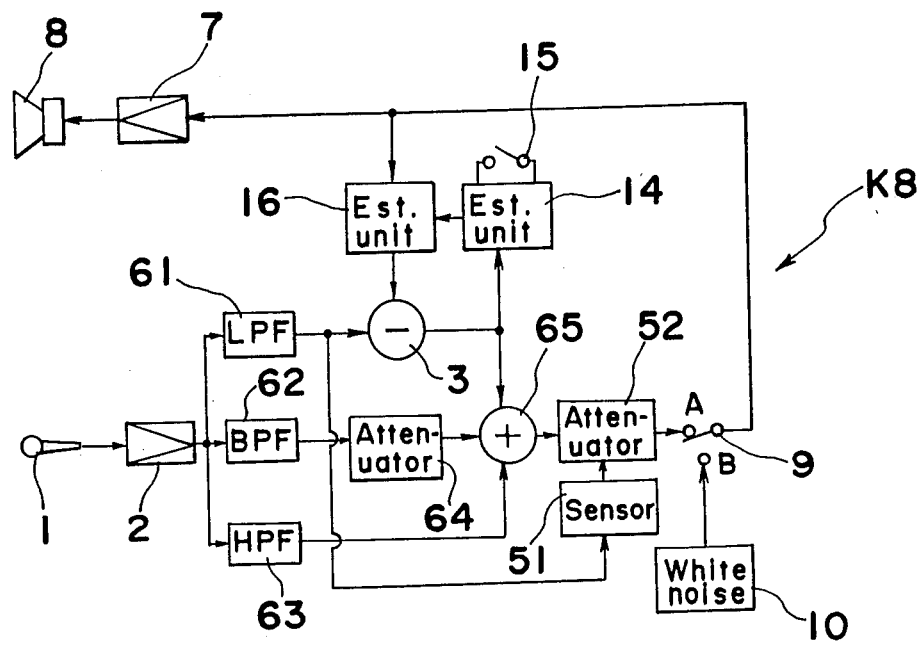

Referring to FIG. 12, there is shown a howling canceller K8 according to an eighth embodiment of the present invention. As in the howling canceller K3 of FIG. 6, the howling canceller K8 includes the sensor 51 for detecting howling in the low frequency range and the attenuator 52 for the overall frequency range, which increases the attenuated amount when howling has been detected by the sensor 51. Since other constructions of the howling canceller K8 are the same as those of the howling canceller K4, detailed description thereof is abbreviated for the sake of brevity.

In the howling canceller K8, automatic adjustment of gain of the loudspeaker system based on howling in the low frequency range, which cannot be performed in the howling canceller K7, can be performed and thus, the howling canceller K8 can be operated remarkably easily.

Meanwhile, the howling cancellers K1 to K8 can be combined with each other properly. For example, if the howling canceller K6 of FIG. 10 is combined with the howling canceller K7 of FIG. 11, howling in the intermediate frequency range and the low frequency range can be automatically adjusted more effectively.

Figure 13:
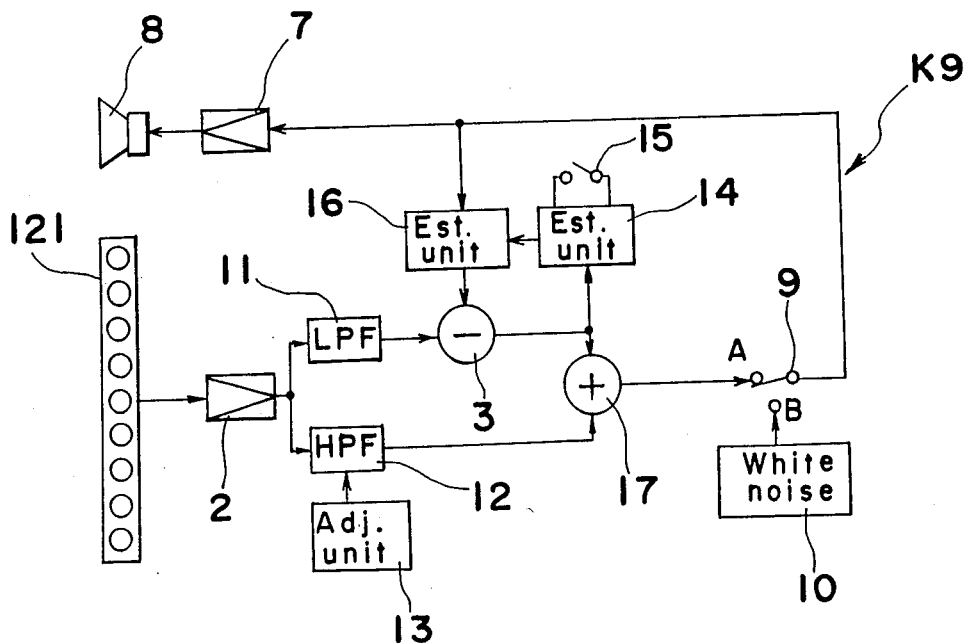
Figure 14:
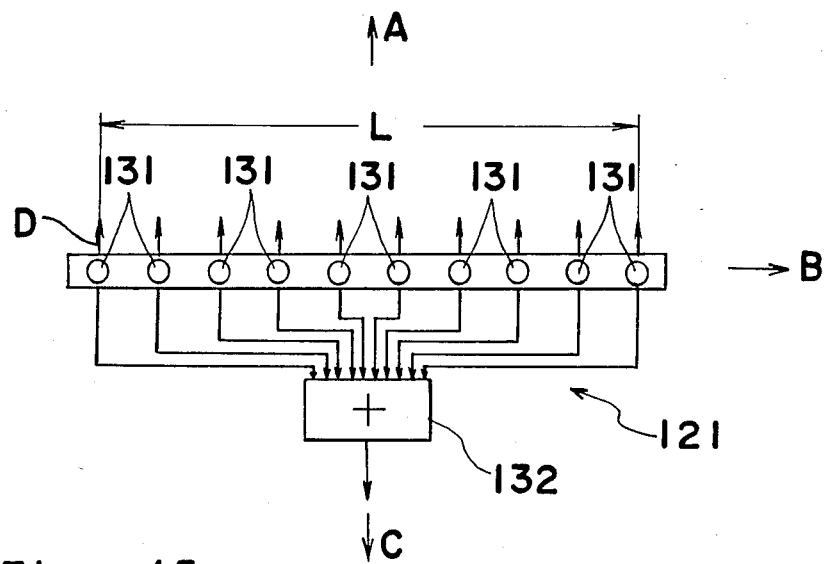
FIG. 14 is a schematic view explanatory of configuration of an array type highly directive microphone employed in the howling canceller of FIG. 13.

Referring further to FIG. 13, there is shown a howling canceller K9 according to a ninth embodiment of the present invention. The howling canceller K9 includes a highly directive microphone 121. Since other constructions of the howling canceller K9 are the same as those of the howling canceller K1, detailed description thereof is abbreviated for the sake of brevity. More specifically, as shown in FIG. 14, the highly directive microphone 121 is of array type and includes a plurality of unidirectional microphones 131 having a directivity oriented in the direction of the arrow D and an adder 132 for adding outputs of the microphones 131 to each other. A distance L between opposite outermost ones of the microphones 131 ranges from 20 cm to 1 m.

Figure 15:
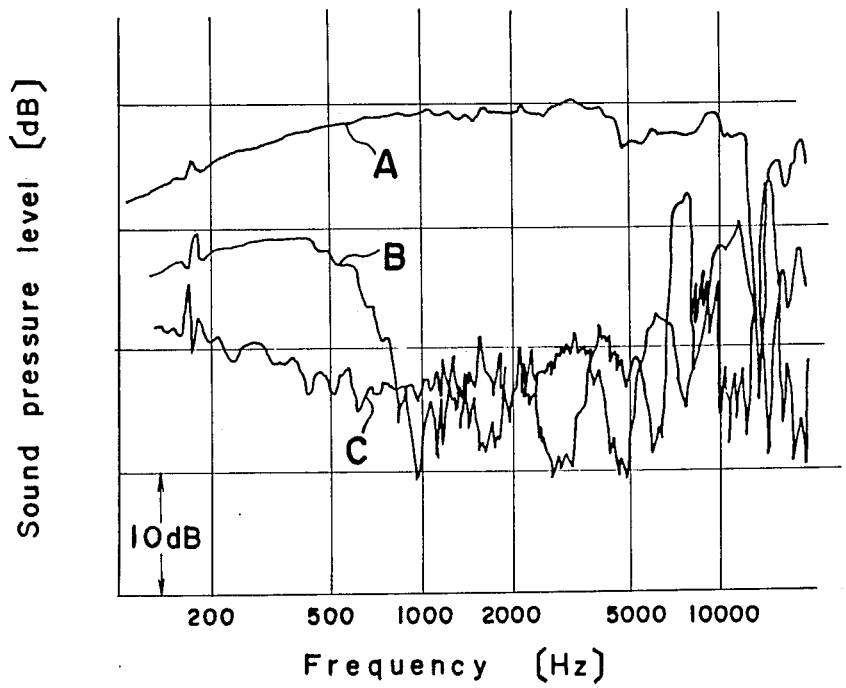
FIG. 15 is a graph indicative of frequency sensitivity characteristics of the microphone of FIG. 14.

FIG. 15 shows frequency characteristics of the microphone 121 in the case where the distance L measures 40 cm. In FIG. 15, curves A, B and C illustrate the frequency characteristics corresponding to the directions of the arrows A, B and C in FIG. 14, respectively, i.e., the forward direction of the arrow A, the sidewise direction of the arrow B and the rearward direction of the arrow C with respect to the microphone 121 such that the sidewise direction of the arrow B and the rearward direction of the arrow C from an angle of 90° with and an angle of 180° with the forward direction of the arrow A, respectively. It will be understood from FIG. 15 that directivity of the microphone 121 becomes sharp at frequencies exceeding 1 KHz. A frequency fc at which directivity of the microphone 121 starts to be sharpened is given by:

$$fc = c/L [Hz] \qquad (3)$$

where: c = sound velocity.

Let the distance L and the sound velocity c be 40 cm and 340 m/sec., respectively, the frequency fc assumes a value of 850 Hz.

Figure 16:
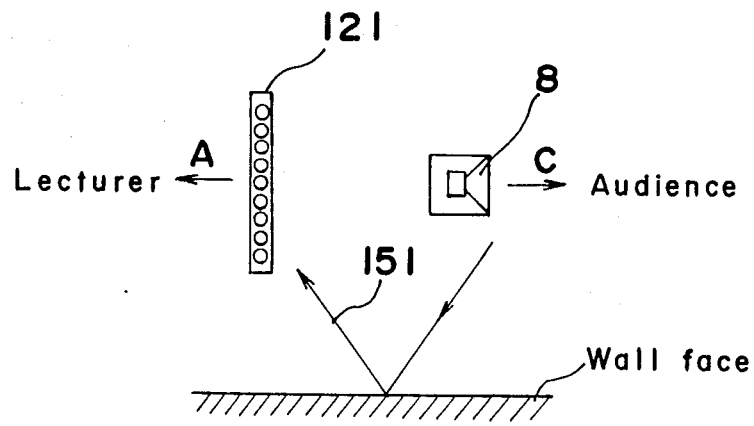
FIG. 16 is a view indicative of setting of the microphone of FIG. 14 and a loudspeaker.

Accordingly, when the highly directive microphone 121 is oriented towards a lecturer in the forward direction A of the microphone 121 and the loudspeaker 8 is oriented towards an audience in the rearward direction C of the microphone 121 as shown in FIG. 16, an echo signal proceeding from the loudspeaker 8 to the microphone 121 can be minimized. In the case where an ordinary unidirectional microphone is employed, it was found that since the microphone is highly sensitive to a reflected sound 151 from a wall face, it is impossible to reduce the echo signal.

Figure 17:
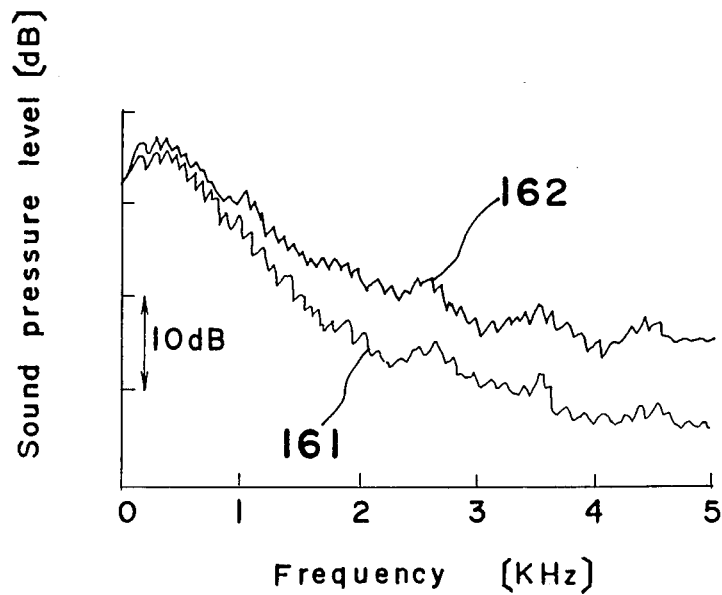
FIG. 17 is a graph indicative of transfer characteristics between the microphone and the loudspeaker of FIG. 16.

FIG. 17 shows one example of measured values of transfer characteristics between the loudspeaker and the microphone set as shown in FIG. 16. In FIG. 17, reference numerals 161 and 162 represent transfer characteristics of the highly directive microphone 121 and of the unidirectional microphone, respectively. Since directivity of the highly directive microphone 121 becomes extremely sharp in the high frequency range as described above, the transfer characteristic 161 becomes exceedingly small in the high frequency range. Accordingly, in the howling canceller K9 provided with the highly directive microphone 121, howling seldom takes place in the high frequency rnge. Thus, the howling canceller K9 can be used without the need for raising the cut-off frequency of the HPF 12 in almost all sound fields, thereby enabling the input of the microphone 121 to be loudened into sounds of excellent tone quality.

Furthermore, since the microphone 121 is an array type highly directive microphone, the microphone 121 has an excellent S/N ratio and therefore, does not readily pick up noises therearound, so that a distance between the lecturer and the microphone 121 can be increased. Moreover, since the microphone 121 has an elongated shape, the microphone 121 has an excellent space factor on a desk or a platform and therefore, can be used quite easily.

Figure 18:
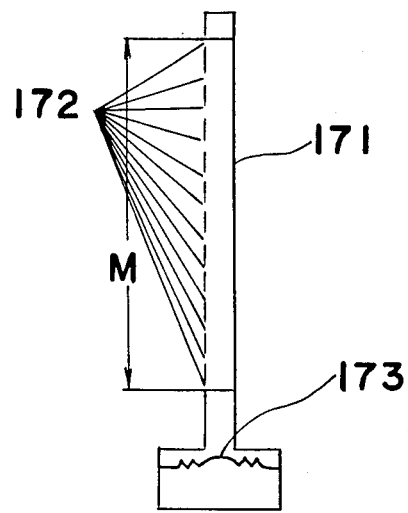
FIGS. 18 and 19 are schematic views explanatory of configurations of linear and parabolic type microphones, respectively.
Figure 19:
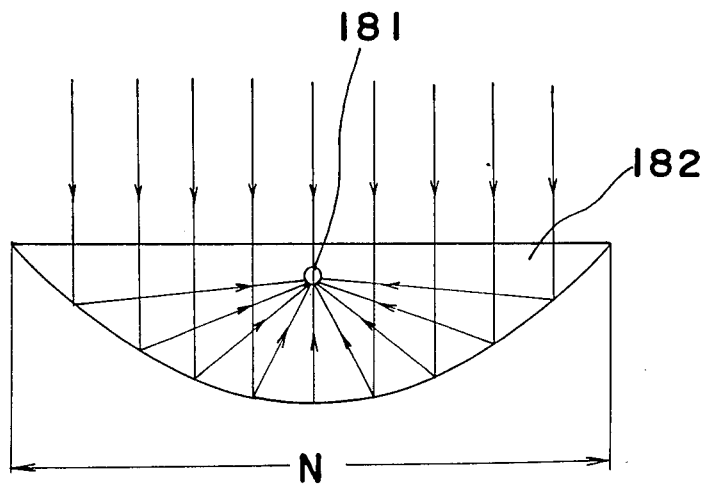

Meanwhile, although the highly directive microphone 121 is of an array type so as to have a high directivity in a horizontal plane only in the howling canceller K9, a linear type microphone of FIG. 18 and a parabolic type microphone of FIG. 19 can also be employed in the case where a spatial directivity is required. The linear type microphone of FIG. 18 includes a housing 171, a plurality of sound apertures 172 and a vibrating plate 173 and has a high directivity over a distance M between opposite outermost ones of the sound apertures 172. Meanwhile, the parabolic type microphone of FIG. 19 includes a unidirectional microphone 181 and a parabola 182 and its high directivity depends on a size N of the parabola 182.

Furthermore, although the howling canceller K9 of FIG. 13 is combined with the howling canceller K1, it is needless to say that the howling canceller K9 can also be combined with any one of the howling cancellers K2 to K8.

Figure 20:
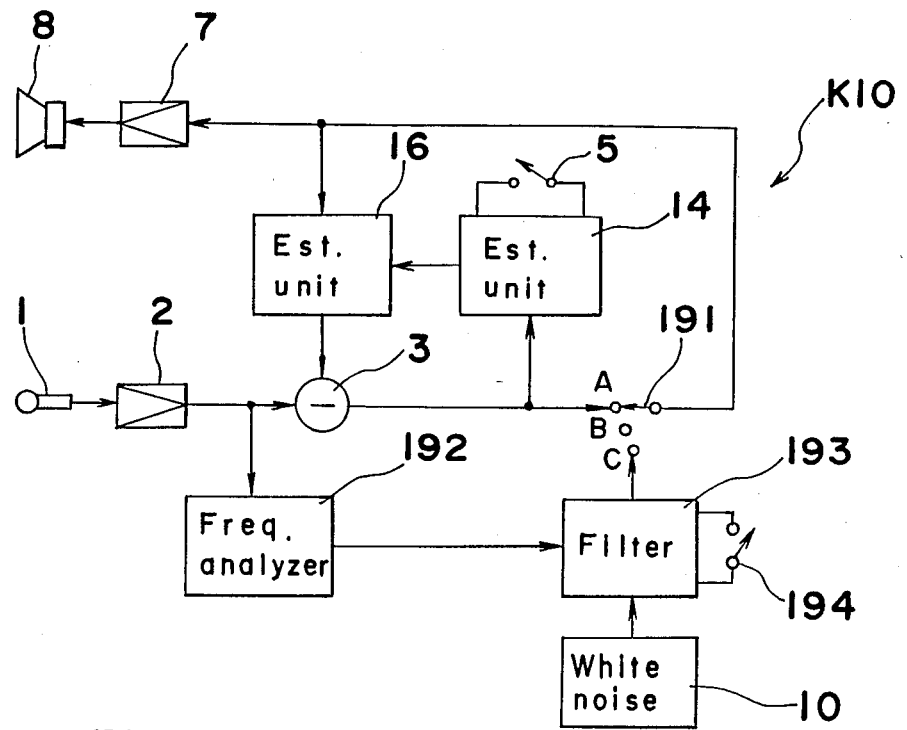
FIG. 20 is a diagram similar to FIG. 2, particularly showing a howling canceller according to a tenth embodiment of the present invention.

Hereinbelow, a howling canceller K10 according to a tenth embodiment of the present invention will be described with reference to FIGS. 20 to 22. As shown in FIG. 20, the howling canceller K10 includes the microphone 1, the microphone amplifier 2, the subtracter 3, the transfer characteristic estimation unit 14, the switch 5 for controlling the estimation unit 14, the echo signal estimation unit 16, the loudspeaker amplifier 7, the loudspeaker 8 and the source 10 of white noises, all of which are employed in the howling canceller K1. The howling canceller K10 further includes a switch 9 for controlling operations of the loudspeaker system, a frequency analyzer 192, a filter 193 and a switch 194 for controlling the filter 193.

Figure 1:
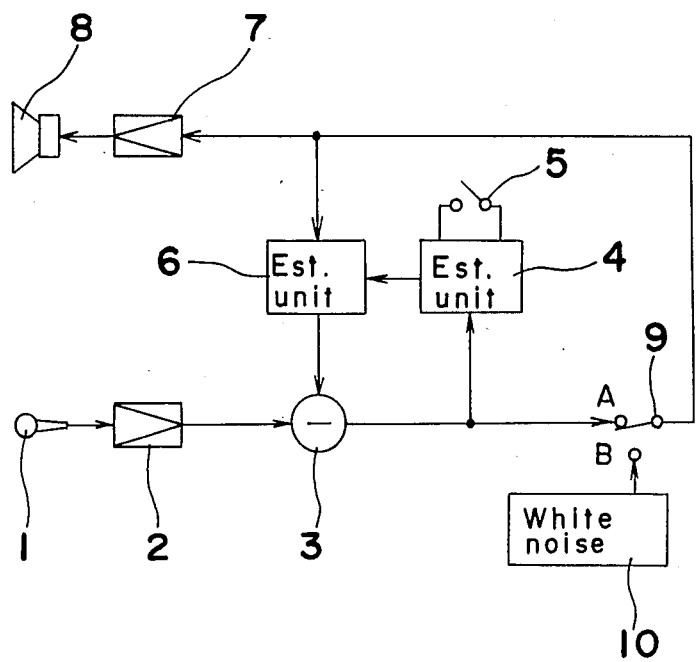
FIG. 1 is a block diagram of a prior art howling canceller (already referred to)

The howling canceller K10 of the above described arrangement is operated as follows. Initially, before the input of the microphone 1 is loudened, the switch 191 is connected to a contact B such that frequency analysis of noises in the room is performed in a state of absence of a loudened sound from the loudspeaker 8. The noises of the room are received by the microphone 1 and then, are amplified by the microphone amplifier 2 so as to be subjected to frequency analysis by the frequency analyzer 192. The outcome of the frequency analysis is delivered to the filter 193. At this time, the switch 194 is held in a closed state such that a frequency characteristic of the filter 193 is variable. The frequency characteristic of the filter 193 is so controlled as to assume a higher gain at a frequency band having a higher noise level. Subsequently, the switch 194 is opened so as to prevent variation of the frequency characteristic of the filter 193. Then, the switch 191 is connected to a contact C such that the transfer characteristic is estimated by the estimation unit 14. Thereafter, the switch 191 is connected to a contact A such that the input of the microphone 1 is loudened by the loudspeaker system. In the howling canceller K10, estimation of the transfer characteristic and subsequent loudening of the input of the microphone 1 are performed in the same manner as in the prior art howling canceller of FIG. 1. However, the howling canceller K10 is different from the known howling canceller of FIG. 1 in that the signal for estimating the transfer characteristic is colored by the filter 193 in the howling canceller K10.

Figure 21:
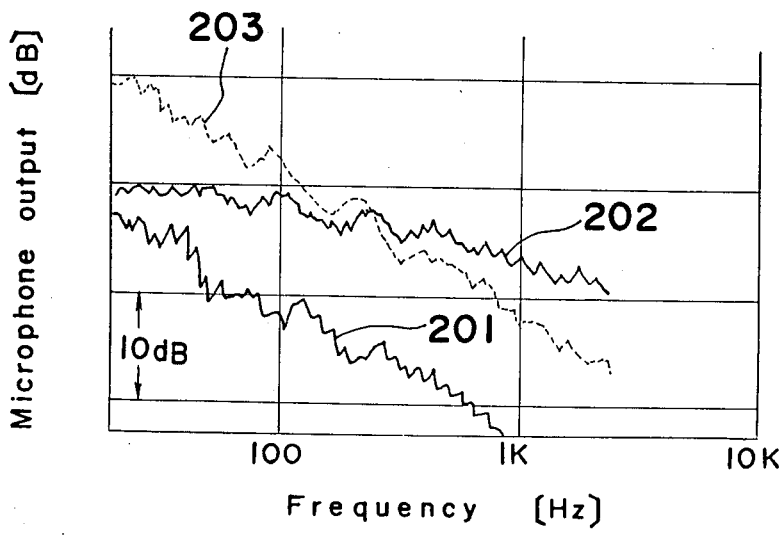
FIG. 21 is a graph indicative of frequency characteristics of output signals of a microphone amplifier employed in the howling canceller of FIG. 20.
Figure 22:
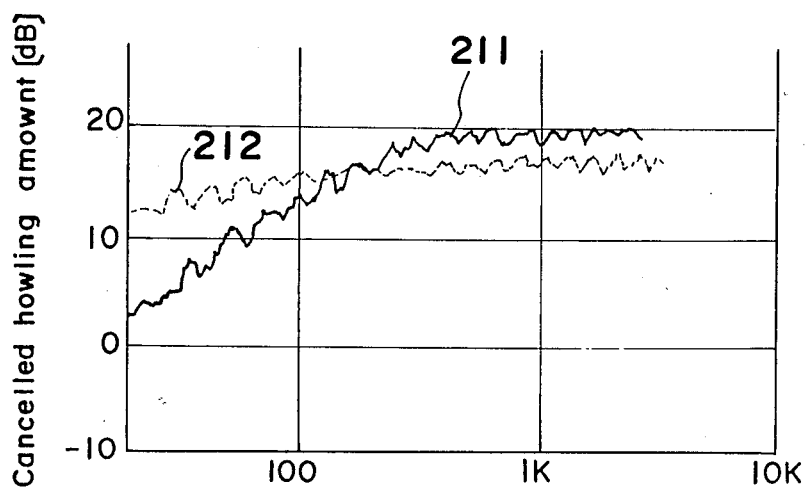
FIG. 22 is a graph indicative of frequency characteristics of amounts of cancelled howling of the howling canceller of FIG. 20.

FIGS. 21 and 22 are views of transfer characteristics illustrating effects of the howling canceller K10. FIG. 21 illustrates one example of frequency analysis of the output of the microphone amplifier 2. In FIG. 21, reference numeral 201 represents a noise level in the room, reference numeral 202 represents a level in the case of estimation of the transfer characteristic in the prior art howling canceller employing white noises as the signal for estimating the transfer characteristic and reference numeral 203 represents a level in the case of the howling canceller K10 employing colored noises as the signal for estimating the transfer characteristic. Meanwhile, FIG. 22 illustrates transfer characteristics of cancelled howling amounts at the time of loudening of the input of the microphone 1. In FIG. 22, reference numeral 211 represents a transfer characteristic of the prior art howling canceller, while reference numeral 212 represents a transfer characteristic of the howling canceller K10. It will be seen from FIG. 21 through comparison between the noise level 201 and the level 202 that the S/N ratio of the prior art howling canceller is extremely inferior in the low frequency range. Thus, as indicated by the transfer characteristic 211 of FIG. 22, the cancelled howling amount of the prior art howling canceller is quite small in the low frequency range. Therefore, in the prior art howling canceller, since howling is likely to take place in the low frequency range, it is impossible to increase a loudened amount of the input of the microphone 1 in the low frequency range. In order to eliminate such a drawback of the prior art howling canceller, a level of a sound for estimating the transfer characteristic is raised further. However, as described earlier, in the case of a room of poor sound proof, noises outside the room penetrate into the room and, at the same time, sounds in the room leak out of the room. Consequently, in the howling canceller K10, the level 203 is set high in a frequency band having a high noise level 201 and is set low in a frequency band having a low noise level 201. Thus, in the howling canceller K10, a sufficient S/N ratio is secured in the overall frequency bands even if the level 203 as a whole is low, namely the sound volume is perceived as being small.

In the case where the sound for estimating the transfer characteristic is of the level 203, howling can be substantially satisfactorily cancelled from the low frequency range to the high frequency range as indicated by the transfer characteristic 212. As is clear from the foregoing, in the howling canceller K10, howling can be sufficiently cancelled by using the sound of small sound volume for estimating the transfer characteristic.

Figure 23:
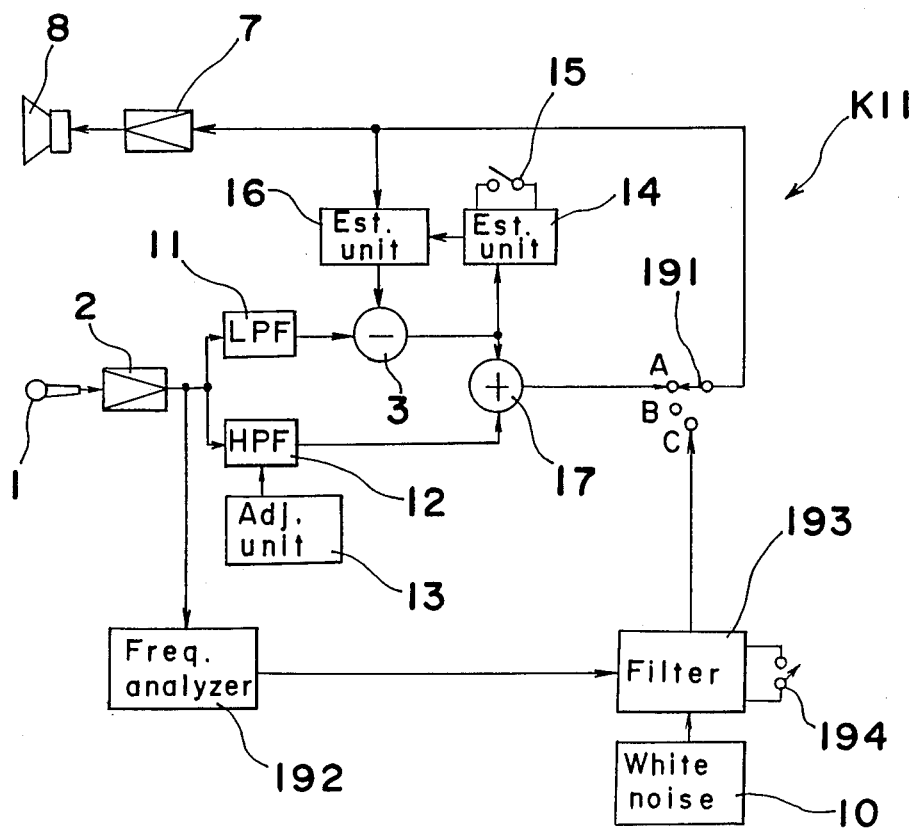
FIG. 23 is a diagram similar to FIG. 2, particularly showing a howling canceller according to an eleventh embodiment of the present invention.

Referring finally to FIG. 23, there is shown a howling canceller K11 according to an eleventh embodiment of the present invention. The howling canceller K11 is a combination of the howling cancellers K1 and K10. The howling canceller K11 is capable of effectively cancelling howling and can be produced at low cost. Although the howling canceller K10 is combined with the howling canceller K1 in the howling canceller K11, it is needless to say that the howling canceller K10 can also be combined with any one of the howling cancellers K2 to K9.

As is clear from the foregoing description, in the howling canceller according to one preferred embodiment of the present invention, cancellation of howling through elimination of the echo signal is performed in the low frequency range only, while howling in the intermediate frequency range and the high frequency range is cancelled either through adjustment of the transfer characteristic by the filters or by the use of the highly directive microphone. Therefore, in accordance with the present invention, the howling canceller capable of effectively cancelling howling can be produced at low cost and can be operated efficiently through the automatic adjusting function in operative association with the howling sensor.

Furthermore, in the howling canceller according to another embodiment of the present invention, since the frequency analyzer for performing frequency analysis of noises in the room and the filter for controlling the frequency characteristic in accordance with the outcome of the frequency analysis are provided, the colored noises having the frequency characteristic corresponding to the noses in the room can be employed as the sound for estimating the transfer characteristic. Consequently, in accordance with the present invention, howling can be sufficiently cancelled in the overal frequency bands by using the sound of small sound volume for estimating the transfer characteristic.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A howling canceller comprising:
   a group of filters for dividing an output of a microphone into a plurality of frequency bands, which includes a first filter having a pass band lower than that of any other one of said filters;
   a subtracter;
   an impulse response estimation unit for estimating an impulse response of an echo path from a loudspeaker to said first filter by using an output of said subtracter;
   an echo signal estimation unit for producing, by using an estimated impulse response outputted from said impulse response estimation unit and an input signal applied to said loudspeaker, an approximate echo signal such that said subtracter subtracts an output of said echo signal estimation unit from an output of said first filter;
   an adder for adding an output of said subtracter to outputs of said filters other than said first filter;
   a low-frequency howling sensor for detecting howling in the pass band of said first filter; and
   an overall-frequency attenuator for attenuating an output of said adder when the howling in the pass band of said first filter has been detected by said low-frequency howling sensor.

2. A howling canceller as claimed in claim 1, wherein said filters comprise a high-pass filter and a low-pass filter, said low pass filter comprising said first;
   and wherein said howling canceller further includes a cut-off frequency adjustment unit for adjusting a cut-off frequency of said high-pass filter.

3. A howling canceller as claimed in claim 2, further comprising:
   a high-frequency howling sensor for detecting howling in a pass band of said high-pass filter;
   wherein said cut-off frequency adjustment unit raises the cut-off frequency of said high-pass filter when the howling in the pass band of said high-pass filter has been detected by said high-frequency howling sensor.

4. A howling canceller as claimed in claim 1, wherein said filters comprise a high-pass filter and a low-pass filter;
   and wherein said howling canceller further comprises a cut-off frequency adjustment unit for adjusting a cut-off frequency of said high-pass filter.

5. A howling canceller as claimed in claim 4, further comprising:
   a high-frequency howling sensor for detecting howling in a pass band of said high-pass filter;
   wherein said cut-off frequency adjustment unit raises the cut-off frequency of said high-pass filter when the howling in the pass band of said high-pass filter has been detected by said high-frequency howling sensor.

6. A howling canceller as claimed in claim 1, wherein said filters comprise a high-pass filter, a band-pass filter and a low-pass filter, said low pass filter comprising said first filter;
   wherein said howling canceller further includes an intermediate-frequency attenuator for attenuating an output of said band-pass filter.

7. A howling canceller as claimed in claim 1, wherein said filters comprise a high-pass filter, a band-pass filter and a low-pass filter;
   and wherein said howling canceller further comprises an intermediate-frequency attenuator for attenuating an output of said band-pass filter.

8. A howling canceller as claimed in claim 7, further comprising:
   a high-frequency howling sensor for detecting howling in a pass band of said high-pass filter; and
   a cut-off frequency adjustment unit for simultaneously adjusting a cut-off frequency of said high-pass filter and a higher cut-off frequency of said band-pass filter, which simultaneously raises the cut-off frequency of said high-pass filter and the higher cut-off frequency of said band-pass filter when the howling in the pass band of said high-pass filter has been detected by said high-frequency howling sensor.

9. A howling canceller as claimed in claim 7, further comprising:
   an intermediate-frequency howling means for detecting howling in a pass band of said band-pass filter;
   wherein said intermediate-frequency attenuator attenuates the output of said band-pass filter when the howling in the pass band of said band-pass filter has been detected by said intermediate-frequency howling sensor; and wherein said intermediate-frequency attenuator does not attenuate the output of said band-pass filter when the howling is not detected by said intermediate-frequency howling sensor.

10. A howling canceller as claimed in claim 1, further comprising:

a frequency analyzer for performing frequency analysis of an output signal of said microphone when said output signal of said microphone includes only the noise in the room;

a filter whose frequency characteristic is controlled in accordance with an output level of said frequency analyzer so as to have a higher gain at a frequency where said output level is higher and so as to have a lower gain at a frequency where said output level is lower; and a white noise generator which supplies a signal for estimating said impulse response to a loudspeaker through said filter whose frequency characteristic is controlled by said frequency analyzer.

* * * * *